3,352,832
COPOLYMERS OF N-SUBSTITUTED MALEIMIDES

Dennis Arthur Barr, Welwyn, Eric Nield, Stevenage, and John Brewster Rose, St. Albans, England, assignors to Imperial Chemical Industries Limited, London, England, a corporation of Great Britain
No Drawing. Filed Nov. 12, 1963, Ser. No. 323,108
Claims priority, application Great Britain, Nov. 16, 1962, 43,400/62
12 Claims. (Cl. 260—78)

This invention relates to new copolymers derived from maleimide and more particularly to copolymers of certain N-aryl maleimides with ethylenically unsaturated hydrocarbons.

The specification of United States Patent 2,301,356 describes the copolymerisation of maleimide and some of its N-substituted derivatives with certain vinylidene compounds. It is stated in the specification that N-aryl substituted maleimides tend to be dark coloured and that their copolymerisation is less ready than that of other maleimides. We have found surprisingly that while N-phenyl maleimide and certain of its substituted derivatives are often coloured, they may be copolymerised with certain monomers with ease to give products which when free from monomer are substantially colourless. They are also stable at elevated temperatures.

According to the present invention, therefore, we provide new copolymers of N-phenyl maleimide, or a derivative thereof in which at least one of the aromatically bound hydrogen atoms has been substituted by a halogen atom, a nitro group, a nitrile group or an alkyl or alkoxy group containing from 1 to 4 carbon atoms, and an alpha-olefin.

By an alpha-olefin we mean a compound which is either a monoethylenically unsaturated alphatic compound or a conjugated diene each consisting only of carbon atoms and hydrogen atoms and containing the group $CH_2=C<$. Examples of these compounds are ethylene, propylene, butene-1, isobutene, n-pentene, n-hexene, 2-methyl butene-1, 2-methyl pentene-1, 4-methyl pentene-1, diisobutylene, n-octene, n-decene, n-undecene, n-dodecene, n-octadecene and butadiene. Since the polymers derived from those of our alpha-olefins which are dienes tend to be cross-linked products which are insoluble in most solvents and difficult to fabricate, we prefer the alpha-olefin to be monoethylenically unsaturated.

Of the monoethylenically unsaturated alpha-olefins, we prefer those containing up to eight, and more preferably not more than six, carbon atoms since the high molecular weight copolymers derived from these are strong and of high softening point and suitable for moulding materials. We further prefer those monoethylenically unsaturated alpha-olefins containing no more than five carbon atoms in the longest chain because we have found in general that as the chain length of the hydrocarbon increases so its ease of polymerisation to high molecular weight polymer decreases. Also, the lower molecular weight hydrocarbons are normally the cheaper materials.

Of the N-(halogen-substituted phenyl) maleimides we prefer the bromo- or chloro-substituted derivatives because of their ready availability. Examples are N-(2-chloro-phenyl) maleimide, N-(3-chloro-phenyl) maleimide, N-(4-chloro-phenyl) maleimide, N-(4-bromo-phenyl) maleimide, N-(2,4,6-trichlorophenyl) maleimide and N-(2,4,6-tribromo-phenyl) maleimide. Other N-(substituted phenyl) maleimides which may be used include N-(2-methyl-phenyl) maleimide, N-(3-methyl-phenyl) maleimide, N-(4-methyl-phenyl) maleimide, N-(2-t-butyl-phenyl) maleimide, N-(3-t-butyl-phenyl) maleimide, N-(4-t-butyl-phenyl) maleimide, N-(2-nitro-phenyl) maleimide, N-(3-nitro-phenyl) maleimide, N-(4-nitro-phenyl) maleimide, N-(2,4-dinitro-phenyl) maleimide, N-(2-methoxy-phenyl) maleimide, N-(3-methoxy-phenyl) maleimide, N-(4-ethoxy-phenyl) maleimide, N-(4-cyano-phenyl) maleimide and N-(2-methyl-4-chloro-phenyl) maleimide. Of the N-substituted-phenyl) maleimides, we prefer those containing at least one chlorine or bromine atom because their copolymers generally have flame-resistant properties.

As the maleimide derivative content of our copolymers increases, so does the softening point and we have found that in the case of copolymers containing more than 75 and often more than 60, mole percent of the maleimide derivative, the softening points tend to be too high to allow their fabrication without the occurrence of an undesirable amount of decomposition. On the other hand, we have found that with most alpha-olefins it is difficult to obtain copolymers containing less than about 50 mole percent of the maleimide derivative because of the inability of the alpha-olefins to homopolymerise under the conditions used for copolymerisation.

According to a further embodiment of our invention, therefore, we prefer our copolymers to contain from about 50 mole percent to 75, preferably 60, mole percent of the maleimide derivative. We further prefer those copolymers containing about 50 mole percent.

According to another embodiment of our invention we provide a process which comprises subjecting to polymerising conditions, in the presence of at least 0.05 percent by weight of the monomers of a free radical catalyst, an alpha-olefin and N-phenyl maleimide or a derivative thereof in which at least one of the aromatically bound hydrogen atoms has been substituted by a halogen atom, a nitro group, a nitrile group or an alkyl or alkoxy group containing from 1 to 4 carbon atoms. We prefer the monomers to be polymerised to give approximately equimolar copolymers.

Where one of the monomers is less easily polymerised than the other monomer or monomers present, it is preferred to add this monomer in excess of the nominal amount required to give the desired ratio in the eventual copolymer. For example, in the copolymerisation of N-phenyl maleimide with propylene, it is desirable to use more than an equimolar amount of propylene in order to obtain an equimolar copolymer.

Mixtures of our maleimide derivatives and mixtures of our alpha-olefins may be used if desired and one or more other copolymerisable monomers may be added so long as the total molar amount of such monomers present in the copolymer is less than the total molar amount of the derivatives and less than the total molar amounts of the alpha-olefins present. Suitable comonomers include N-esters of maleic and fumaric acids, vinyl esters, esters of acrylic and methacrylic acids, vinyl chloride, vinylidene chloride, acrylonitrile, acrolein, styrene and substituted styrenes, vinyl and isopropenyl ethers and halogenated dienes such as chloroprene. Where it is found that an alkene copolymerises only with difficulty with the maleimide derivative to give a product of low molecular weight, we have found that it is advantageous to add a small quantity of styrene to the polymerisation since then good yields of high molecular weight products are generally achieved. Five to 25 mole percent of comonomer is generally useful.

The polymerisation may be effected in bulk, in solution in an inert organic solvent or in suspension. As the maleimide derivatives are not hydrolysed to an appreciable extent by water, the suspension may be an aqueous suspension.

By an inert organic solvent, we mean an organic compound which is a solvent for the monomers but does not react with them. In general, we prefer the solvent to be a compound which has little or no chain transfer effect in the polymerisation.

Suitable solvents are aromatic hydrocarbons such as benzene and toluene, ethers such as dioxane, ketones such as acetone and alcohols such as methanol, ethanol and isopropanol. Chlorinated hydrocarbons such as methylene chloride or ethylidene dichloride may be used but are known to have chain transfer tendencies. We prefer to use a solvent in which the copolymer is not soluble or is soluble only to a small extent since this aids separation of the copolymer from monomer and catalyst residues. Suitable solvents are the alcohols, particularly methanol. The polymerisation may also be effected in the presence of some aliphatic hydrocarbons, such as heptane, hexane, or pentane but these are poor solvents for our maleimide derivatives and if they are used it is preferred to carry out the polymerisation with continuous agitation.

The polymerisation is effected preferably at temperatures of from 10° C. to 90° C. Higher or lower temperatures may be used if desired but the use of lower temperatures generally results in unduly long reaction times while the use of higher temperatures involves additional heating expenses; temperatures of 30° C. to 90° C. are generally satisfactory. In solution polymerisation, some of the monomers have an undesirable tendency to precipitate out from the solvents at temperatures at much below about 30° C. but the use of temperatures down to 10° C. may be useful where it is desired to obtain products of high molecular weight.

Any free-radical catalyst may be used to initiate the polymerisation but we prefer to use one which is suitable within the temperature range of 10° C. to 90° C. Examples are azo-di-iso-butyronitrile, boron trialkyls with a trace of oxygen and benzoyl peroxide. The use of less than 0.05% of the catalyst, calculated on the total weight of polymerisable monomers, gives little or no polymerisation or very long polymerisation times while the use of amounts in excess of 5% is uneconomical. We prefer to use from 0.5 to 2% and preferably about 1%.

Our preferred polymerisation is effected in bulk or in an inert organic solvent because the separation of the polymeric products from the monomer is then a simple operation.

The polymerisation is generally effected in the presence of, at the most, only small amounts of oxygen. It may be effected suitably under an inert gas such as nitrogen or under the vapour of the monomers.

The polymerisation may be effected at any suitable pressure. Where it is desired to effect the polymerisation under superatmospheric pressure, nitrogen gas or any other suitable inert gas may be used to pressurise the system. Where volatile compounds are present (e.g., either as monomer or solvent) their vapour pressure may also be utilised to pressurise the system.

In a preferred process, the polymerisation vessel is charged with the monomers, the catalyst and the solvent, if used, and the vessel is then alternately pressurised with an inert gas such as nitrogen and then evacuated. This cycle may be repeated to ensure as complete removal of air as possible. Even with these stringent efforts to remove oxygen, there is generally sufficient present to activate a boron trialkyl catalyst when it is used. The polymerisation mixture is finally blanketed with the inert gas and the vessel is brought to the polymerisation temperature.

Where one or more of the copolymerisable monomers is a gas, e.g., ethylene, the other monomeric material, the solvent, if any, and catalyst are charged into the vessel first and it is then purged of air before the gaseous monomer is bled in.

When the polymerisation has been completed, the mixture is cooled and the polymer separated from the monomer and catalyst residues by any suitable process such as distillation or solvent extraction. The polymer may be purified conveniently by breaking it up, washing it, dissolving it in a suitable solvent such as chloroform or dimethyl formamide and re-precipitating it from a non-solvent such as methanol, diethyl ether or petroleum ether.

Although the maleimide derivatives from which they are formed are often coloured, the copolymers when free from monomer residues are substantially colourless. They differ from similar copolymers derived from maleimide and most other N-substituted maleimides (e.g., N-alkyl maleimides) by their lack of water sensitivity. They also differ from N-alkyl maleimide copolymers by having generally higher softening points.

The high molecular weight compounds derived from alpha-olefins containing up to eight carbon atoms are strong, generally transparent and of high softening point (generally of the order of 200–280° C.). They are also generally stable at their softening points, or even above, and may be moulded to give strong clear colourless articles. They may also be melt cast to give sheets of good thermal stability and optical clarity and may be melt spun to give strong amorphous fibres. We prefer those copolymers which have molecular weights equivalent to a reduced viscosity of 0.4 or more (measured on a solution of 0.5 gm. of the polymer in 100 ccs. of dimethyl formamide at 25° C.) as they have very useful physical properties such as high rigidity and strength.

The copolymers are soluble in a number of common polar solvents such as chloroform and dimethyl formamide from which they may be solvent-cast to give transparent films or solvent-spun to give useful fibres. Coatings may also be obtained from aqueous dispersions.

The strength and clarity of our preferred copolymers make them of use for the manufacture of inspection windows, windscreens and the like and for the fabrication of mouldings such as telephone cases, radio and television cases, dictaphone cases, and small automobile parts by injection moulding, for example.

The polymers may be blended with any suitable additives such as fillers (e.g. fibrous glass or metal powder), pigments, heat and light stabilisers, plasticisers, lubricants and mould-release agents or they may be blended with other polymeric materials, natural or synthetic.

The invention is illustrated by the following examples in which all parts are expressed as parts by weight. In all the examples, the reduced viscosities recorded were measured on solutions of 0.5 gm. of copolymer in 100 ccs. of dimethyl formamide at 25° C.

*Example 1*

5.19 parts of N-phenyl maleimide, 1.68 parts of isobutene, 4.4 parts of benzene and 0.05 part of azo-diisobutyronitrile were charged into a vessel which was purged with nitrogen, degassed and sealed under vacuum. The sealed vessel was then brought to 60° C. and maintained there for one day after which it was cooled and broken open and the contents removed. The resulting polymer was dissolved in chloroform and re-precipitated by pouring the solution into 40–60° petroleum ether. The solid was then separated and dried under vacuum to give 5.9 parts of a copolymer having a reduced viscosity of 0.7 and a $1^0/_{10}$th Vicat softening point of 221.5° C.

Nitrogen and oxygen analyses of the polymer showed it to contain 55–59 mole percent of N-phenyl maleimide.

The polymer was compression moulded at 250–270° C. to give a transparent film which did not craze after total immersion in boiling water for 120 minutes. During the immersion it picked up about 2% by weight of water which was removed again on drying the film.

By way of comparison a copolymer of maleimide and isobutene containing ca. 50% molar of the maleimide and having a reduced viscosity of 0.93 was compression moulded at 260° C. to give a film which became opaque upon immersion in boiling water after only a few minutes and picked up 7% by weight of water after immersion for two hours not all of which could be removed on re-drying.

Example 2

The process of Example 1 was repeated using 5.19 parts of N-phenyl maleimide, 3.78 parts of propylene, 13.2 parts of benzene and 0.05 part of acetyl cyclohexyl sulphonyl peroxide. Polymerisation was effected at 30° C. for two days.

The resulting polymer was dissolved in chloroform and reprecipitated from diethyl ether from which it was separated and dried under vacuum. The product was 5.6 parts of a copolymer having a reduced viscosity of 0.49 and a $1^{0}/_{10}$th Vicat sofetening point of 218.5° C.

Analysis of the polymer showed it to contain 50–56 mole percent of N-phenyl maleimide.

The polymer was compression moulded at 250–270° C. to give a transparent film which did not craze after total immersion in boiling water for 120 minutes. During the immersion it picked up about 2.5% by weight of water which was removed again on drying the film.

Example 3

5.61 parts of N-o-tolyl maleimide, 5.02 parts of isobutene, 16 parts of methanol and 0.05 part of azo-diisobutyronitrile were degassed and sealed in vacuum and kept at 60° for four days. The reaction vessel was then opened and polymer removed, extracted with ether and finally dried under vacuum at 100° C. to yield 6.9 parts of a copolymer having a reduced viscosity of 0.94. The polymer was compression moulded at 270° C. to give a transparent colourless disc having a $1^{0}/_{10}$th Vicat softening point of 212° C. (and a $1/_{10}$th Vicat softening point of 201.5° C.).

Nitrogen analysis of the polymer indicated that it contained 50.7% molar of units derived from the imide while oxygen analysis indicated the amount to be 60.4% molar. A disc of the polymer was boiled in water for two hours at the end of which time a 1.8% increase in weight was observed. This increase was lost on re-drying and the polymer was unchanged in appearance.

Example 4

6.225 parts of N-o-chlorophenyl maleimide, 5.02 parts of isobutene, 16 parts of methanol and 0.05 part of azo-diisobutyronitrile were degassed and sealed in vacuo and kept at 55° for three days. The polymer was then removed from the vessel, extracted with ether and dried under vacuum at 50° C. The yield was 7.4 gms. of a copolymer having a reduced viscosity of 0.85. The polymer gave transparent colourless discs when compression moulded at 250° C. and had a $1/_{10}$ Vicat softening point of 191.5° C. and a $1^{0}/_{10}$ Vicat softening point of 204.5° C.

Example 5

5.19 parts of N-phenyl maleimide, 7.6 parts of 4-methyl pentene-1, 16 parts of methanol and 0.05 part of azo-diisobutyronitrile were degassed and heated in a sealed reaction vessel under vacuum at 50° C. for 11 days. The product was dissolved in chloroform and reprecipitated into ether then dried under vacuum at 100° C. to yield 3.9 parts of a polymer having a reduced viscosity of 0.11. The polymer contained 72.3–77.6 mole percent of N-phenyl maleimide based on oxygen and nitrogen analyses.

Example 6

5.19 parts of N-phenyl maleimide, 5.02 parts of butene-1, 16 parts of methanol and 0.05 part of azo-diisobutyronitrile were degassed and heated for four days under vacuum in a sealed vessel at 60° C. The product was dissolved in chloroform and re-precipitated into ether then dried in vacuum to yield 2.1 parts of a polymer having a reduced viscosity of 0.09. The polymer contained 62.6–67.5 mole percent of N-phenyl maleimide based on oxygen and nitrogen analyses.

Example 7

5.19 parts of N-phenyl maleimide, 5.02 parts of isobutene, 16 parts of methanol and 0.05 part of azo-diisobutyronitrile were degassed and heated under a vacuum in a sealed vessel at 60° C. for two days. The product was extracted with ether and dried under vacuum at 100° C. to yield 6.5 parts of a copolymer having a reduced viscosity of 0.66. The polymer contained 52.4–55 mole percent of N-phenyl maleimide based on oxygen and nitrogen analyses and was compression moulded at 270° C. to transparent colourless discs having a $1/_{10}$th Vicat Softening Point of 191.5° C. and a $1^{0}/_{10}$th Vicat Softening Point of 201° C.

Example 8

5.19 parts of N-phenyl maleimide, 3.32 parts of 4-methyl pentene-1, 1.035 parts of styrene, 16 parts of methanol and 0.05 part of azo-diisobutyronitrile were degassed and heated in a sealed tube under vacuum for one day at 60° C. The product was isolated, extracted with ether and then dried in vacuum at 100° C. to yield 4.9 parts of a polymer having a reduced viscosity of 0.67. The polymer was compression moulded at 270° C. to give an almost colourless translucent disc having a $1/_{10}$ Vicat softening point at 219° C. and a $1^{0}/_{10}$th Vicat softening point of 228° C.

Example 9

Five parts of N-phenyl maleimide, three parts of ethylene at a pressure of 40 to 45 atmospheres, 16 parts of methanol and 0.05 part of azo-diisobutyronitrile were stirred at 45 to 50° C. for 66 hours. The product was extracted with ether for 24 hours and dried in vacuum at 100° C. to yield 3.5 parts of a polymer having a reduced viscosity of 0.33. Nitrogen and oxygen analyses indicated that it contained 60 to 78 mole percent of N-phenyl maleimide. It could be compression moulded at 250° C. to give transparent almost colourless discs.

Example 10

3.46 parts of N-phenyl maleimide, 16 parts of methanol and a solution of 0.014 part of boron triethyl in about 0.25 part of petroleum ether were degassed and placed in a reaction vessel. The vessel was evacuated and then pressurised with 2.52 parts of propylene and sealed with a trace of oxygen. This mixture was then kept at room temperature for seven days. The resulting product was extracted with ether and dried in vacuum to yield 2.3 parts of a polymer having a reduced viscosity of 0.26.

Example 11

5.19 parts of N-phenyl maleimide, 1.12 parts of isobutene, 1.00 part of ethyl acrylate, 12 parts of methanol and 0.05 part of azo-diisobutyronitrile were degassed, sealed in a reaction vessel and heated under vacuum to 55° C. for six days. The product was dissolved in chloroform, re-precipitated into ether and finally dried in vacuum to yield 5.7 parts of a polymer having a reduced viscosity of 0.41. The polymer was compression moulded at 250° C. to give an almost transparent disc.

Example 12

5.19 parts of N-phenyl maleimide, 12 parts of methanol and 0.05 part of acetyl cyclohexyl sulphonyl peroxide were degassed and placed in a reaction vessel which was evacuated and then pressurised with 1.68 parts of a gaseous mixture of essentially $C_4$ hydrocarbons containing 11% by weight of propylene, 27% of butene-1, 40% of isobutene, 6% of butene-2 isomers and 2% of butadiene. The vessel was then sealed and the mixture maintained at room temperature for one day. The product was extracted with ether and dried in vacuum to yield 3.5 parts of a polymer having a reduced viscosity of 0.38. It was compression moulded at 250° C. to give a transparent disc.

Example 13

5.19 parts of N-phenyl maleimide, 16 parts of methanol and 0.05 part of acetyl cyclohexyl sulphonyl peroxide were degassed and placed in a vessel which was evacuated and then pressurised with about 1.7 parts of a gaseous mixture of essentially $C_4$ hydrocarbons containing 7% dry weight of propylene, 16% of butene-1, 27% of isobutene, 8% of butene-2 isomers and 27% of butadiene. The vessel was sealed and maintained at 30° C. for five days. The product was then extracted with ether and dried in vacuum to yield 4.4 parts of an insoluble polymer which could be compression moulded at 250° C. to give a translucent disc.

Example 14

5.19 parts of N-phenyl maleimide, about 3.4 parts of a mixture of essentially $C_4$ hydrocarbons containing 0.7% by weight of propylene, 29% of butene-1, 40% of isobutene, 10% of butene-2 isomers and 2% of butadiene, 12 parts of methanol and 0.05 part of acetyl cyclohexyl sulphonyl peroxide were sealed in a reaction vessel for two days at room temperature. The product was extracted with ether and dried in vacuum to yield 3.7 parts of a polymer having a reduced viscosity of 0.46. It was compression moulded at 250° C. to give a transparent disc.

Example 15

5.19 parts of N-phenyl maleimide, about 3.4 parts of a mixture of essentially $C_4$ hydrocarbons containing 0.3% by weight of propylene, 16% of butene-1, 26% of isobutene, 12% of butene-2 isomers and 29% of butadiene, 12 parts of methanol and 0.05 part of acetyl cyclohexyl sulphonyl peroxide were sealed in a reaction vessel at room temperature for three days. The product was extracted with ether and dried in vacuum to yield 5.5 parts of an insoluble polymer which could be compression moulded at 250° C. to give a translucent disc.

Example 16

5.19 parts of N-phenyl maleimide, 0.9 part of chloroprene, 1.12 parts of isobutene, 13.2 parts of benzene and 0.05 part of azo-diisobutyronitrile were degassed and placed in a reaction vessel which was evacuated and sealed. The contents were maintained at 60° C. for five days. The product was extracted with ether and dried in vacuum to yield 5.6 parts of an insoluble polymer which could be compression moulded to give translucent discs with a $^{10}/_{10}$ Vicat softening point of 149° C.

Example 17

51.9 parts of N-phenyl maleimide, 49.4 parts of isobutene, 160 parts of methanol and 0.5 part of azo-diisobutyronitrile were heated to 55° C. with vigorous shaking in a closed reaction vessel under a combined nitrogen and monomer vapour pressure of 180 lb./sq. in. After 20 hours, when pressure had fallen to 150 lb./sq. in., the system was vented and the solid product was extracted with ether and dried in vacuum at 100° C. to yield 63.9 parts of a copolymer having a reduced viscosity of 0.78. Nitrogen and oxygen analyses indicated that the polymer contained 50–60 mole percent of N-phenyl maleimide. It was amorphous as made and after refluxing for 90 minutes in xylene.

The copolymer was compression moulded at 270° C. to give transparent colourless plaques. The polymer had a melt viscosity of $10 \times 10^3$ poises at 1000 sec.$^{-1}$ which was unchanged after 20 minutes at 270° C.; thus showing the remarkable stability of the polymer at elevated temperatures.

The flexural strength of the polymer was $8.9$–$10.3 \times 10^3$ lb./sq. inch measured on a specimen ¾ inch long x ¼ inch wide x $\frac{1}{16}$ inch thick in a tensile testing machine at 20° C. and a deformation speed of 18 inches/minute. By the same test, the energy to break was 7.8–9.4 ft. lb./cu. in.

Example 18

5.19 parts of N-phenyl maleimide, 49.4 parts of isobutene, 200 parts of water, 0.5 part of sodium lauryl sulphate and 0.5 part of potassium persulphate were placed in a reaction vessel which was pressurised to 210 lb./sq. inch with nitrogen. The mixture was heated to 60–63° C. and shaken vigorously for one hour when the pressure was found to have fallen to 205 lb./sq. inch.

The mixture was then cooled and the vessel vented. About 200 parts of a saturated salt solution was added to the suspension to coagulate the polymer which was filtered off, washed with water and then methanol, and finally dried in vacuum at 100° C. 50.8 parts of a copolymer having a reduced viscosity of 0.57 were obtained. The copolymer could be compression moulded at 270° C. to give transparent plaques.

We claim:
1. A substantially colorless and substantially water-insensitive moldable copolymer consisting essentially of copolymerized units of:
   (i) at least one N-aryl maleimide which is N-phenyl maleimide or a derivative thereof in which at least one of the aromatically bound hydrogen atoms has been substituted by a halogen atom, a nitro group, a nitrile group or an alkyl or alkoxy group containing from 1 to 4 carbon atoms,
   (ii) at least one monoethylenically unsaturated alpha-olefin hydrocarbon containing not more than eight carbon atoms, and
   (iii) at least one other copolymerizable monomer,
and in which the total amount of the copolymerized N-aryl maleimide units is not less than the total molar amount of the alpha-olefin units, and the total amount of the copolymerized units of the other copolymerizable monomer is not more than 25 mole percent.

2. A copolymer according to claim 1 in which the copolymerizable monomer (iii) is styrene, butadiene, chloroprene or ethyl acrylate.

3. A substantially colorless and substantially water-insensitive moldable copolymer consisting essentially of copolymerized units of:
   (i) at least one N-aryl maleimide which is N-phenyl maleimide or a derivative thereof in which at least one of the aromatically bound hydrogen atoms has been substituted by a halogen atom, a nitro group, a nitrile group or an alkyl or alkoxy group containing from 1 to 4 carbon atoms, and
   (ii) at least one monoethylenically unsaturated alpha-olefin hydrocarbon containing not more than eight carbon atoms,
and in which the total molar amount of the copolymerized N-aryl maleimide units is not less than the total molar amount of the alpha-olefin units.

4. A copolymer according to claim 3 in which said alpha-olefin is selected from the group consisting of ethylene, propylene, isobutene, butene-1 and 4-methylpentene-1.

5. A copolymer according to claim 3 in which the N-aryl maleimide is N-phenyl maleimide or a derivative thereof in which at least one of the aromatically bound hydrogen atoms has been substituted by a chlorine or bromine atoms.

6. A copolymer according to claim 3 which consists essentially of copolymerized units of (i) N-phenyl maleimide, N-o-tolyl maleimide or N-o-chlorophenyl maleimide, and (ii) a member of the group consisting of ethylene, propylene, isobutene, butene-1 and 4-methylpentene-1.

7. A copolymer according to claim 3 in which the total amount of copolymerized N-aryl maleimide units is 50 to 75 mole percent.

8. A copolymer according to claim 3 in which the total amount of copolymerized N-aryl maleimide units is 50 to 60 mole percent.

9. A copolymer according to claim 3 which contains about 50 mole percent of copolymerized N-aryl maleimide units.

10. A copolymer according to claim 3 in which the alpha-olefin contains up to six carbon atoms.

11. A copolymer according to claim 3 in which the alpha-olefin contains not more than five carbon atoms in the longest chain.

12. A copolymer according to claim 3 having a reduced viscosity, measured on a solution of 0.5 gm. of polymer in 100 ccs. of dimethyl formamide at 25° C. of at least 0.4.

References Cited

UNITED STATES PATENTS

| 2,301,356 | 11/1942 | Arnold et al. | 260—78 |
| 2,313,565 | 3/1943 | McDowell et al. | 260—78 |
| 2,342,295 | 2/1944 | Orthner | 260—78 |
| 2,384,239 | 9/1945 | Dorough | 260—78 |
| 2,650,215 | 8/1953 | Strain | 260—78 |
| 2,686,774 | 8/1954 | D'Alelio | 260—78 |
| 2,698,316 | 12/1954 | Giammaria | 260—78 |

WILLIAM H. SHORT, *Primary Examiner.*

H. D. ANDERSON, *Assistant Examiner.*

Disclaimer 3,352,832.—*Dennis Arthur Barr*, Welwyn, *Eric Nield*, Stevenage, and *John Brewster Rose*, St. Albans, England. COPOLYMERS OF N-SUBSTITUTED MALEIMIDES. Patent dated Nov. 14, 1967. Disclaimer filed Nov. 22, 1968, by the assignee, *Imperial Chemical Industries Limited*.

Hereby enters this disclaimer to claim 1 of said patent.

[*Official Gazette April 1, 1969.*]

UNITED STATES PATENT OFFICE
Certificate

Patent No. 3,352,832                                    Patented November 14, 1967

Dennis Arthur Barr, Eric Nield and John Brewster Rose

Application having been made by Dennis Arthur Barr, Eric Nield and John Brewster Rose, the inventors named in the patent above identified, and Imperial Chemical Industries Limited, London, England, a corporation of Great Britain, the assignee, for the issuance of a certificate under the provisions of Title 35, Section 256, of the United States Code, deleting the name of Dennis Arthur Barr as a joint inventor, and a showing and proof of facts satisfying the requirements of the said section having been submitted, it is this 28th day of April 1970, certified that the name of the said Dennis Arthur Barr is hereby deleted from said patent as a joint inventor with the said Eric Nield and John Brewster Rose.

LUTRELLE F. PARKER

*Law Examiner.*